(12) United States Patent
Wakashiro et al.

(10) Patent No.: US 6,356,818 B1
(45) Date of Patent: Mar. 12, 2002

(54) CONTROL APPARATUS FOR HYBRID VEHICLE

(75) Inventors: Teruo Wakashiro; Shigetaka Kuroda; Atsushi Izumiura; Atsushi Matsubara; Shinichi Kitajima; Kazutomo Sawamura, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/669,721

(22) Filed: Sep. 26, 2000

(30) Foreign Application Priority Data

Sep. 30, 1999 (JP) .......................................... 11-280682

(51) Int. Cl.$^7$ ............................................... B60K 9/00
(52) U.S. Cl. ........................... 701/22; 701/70; 180/65.1; 180/65.3; 318/376
(58) Field of Search .................... 701/22, 70; 180/65.1, 180/65.3; 318/139, 376

(56) References Cited

U.S. PATENT DOCUMENTS 5,476,310 A * 12/1995 Ohtsu et al. .................... 303/3
6,223,106 B1 * 4/2001 Yano et al. .................... 701/22

FOREIGN PATENT DOCUMENTS

JP          07-123509          5/1995

* cited by examiner

Primary Examiner—Tan Nguyen
(74) Attorney, Agent, or Firm—Armstrong, Westerman & Hattori, LLP (57) ABSTRACT

A hybrid vehicle control apparatus for improving fuel consumption ratio by making appropriate the deceleration perception of the hybrid vehicle is provided. It is determined whether the flag setting of a brake ON determination flag is "1". If the brake is OFF, a brake OFF regeneration amount is obtained, and is assigned to the deceleration regeneration computed value. It is determined whether a remaining batter charge is greater than or equal to a predetermined normal power generation mode execution upper limit remaining charge. In the case where the determination result is yes, it is determined whether a control vehicle speed is greater than or equal to a predetermined high speed deceleration regeneration reduction lower limit vehicle speed. In the case where the determination result is yes, the value obtained by multiplying the deceleration regeneration computed value by a predetermined high speed deceleration regeneration reduction coefficient, for example 0.8, is set as a new deceleration regeneration computed value.

3 Claims, 7 Drawing Sheets

CONTROL APPARATUS FOR HYBRID VEHICLE

BACKGROUND OF THE INVENTION

1. Field of the Invention

The present invention relates to a control apparatus for a hybrid vehicle driven by an engine and a motor. In particular the invention relates to a control apparatus for a hybrid vehicle, which regulates the deceleration regeneration amount by a motor according to traveling conditions.

This application is based on Japanese Patent Application, Unpublished, No. Hei 11-280682, the contents of which are incorporated herein by reference.

2. Description of the Related Art

Heretofore there is known a hybrid vehicle incorporating a motor in addition to an engine as a drive source for vehicle propulsion.

For one type of such hybrid vehicle, there is a parallel hybrid vehicle where the motor is used as an auxiliary drive source for assisting the output from the engine. With this parallel hybrid vehicle, for example at the time of acceleration, the output from the engine is assisted by means of the motor, while at the time of deceleration, various control is carried out such as performing charging of a battery by deceleration regeneration, so that the remaining charge (electrical energy) of the battery can be maintained while satisfying the requirements of the driver. (For example, as disclosed in Japanese Unexamined Patent Application, First Publication No. Hei 7-123509.)

According to the control apparatus for the above-mentioned conventional hybrid vehicle, for example, in a situation where the degree of throttle opening (e.g. the extent of the throttle opening) is fully closed state, or fuel supply to the engine is stopped such as when traveling at high speed, the hybrid vehicle is decelerated by the two actions of regeneration by the motor and engine braking. Therefore, if the deceleration of the vehicle is as the driver has estimated, there is no problem, however, if the deceleration is greater than estimated, against the driver's intention, for example, when there is a vehicle traveling ahead, if the distance from the forward vehicle is increasing, a situation may occur when the accelerator pedal is pressed again with the intention of following the vehicle traveling ahead. In this case, the frequency of regeneration the motor is reduced, the frequency of stopping fuel supply is reduced, and there is a problem of deterioration in fuel consumption rate.

SUMMARY OF THE INVENTION

The present invention takes into consideration the above situation, with the object of providing a control apparatus for a hybrid vehicle that can improve fuel consumption rate by regulating the regeneration amount by the motor to make appropriate the perceived deceleration of a vehicle.

To solve the abovementioned problem and achieve this object, a control apparatus for a hybrid vehicle (hybrid vehicle 10 in an embodiment as mentioned later) comprising: an engine (engine E) for outputting a propulsion force for a vehicle, a motor (motor M) for assisting the output from the engine depending on the driving conditions of the vehicle, and a storage unit (battery 22) for storing generated energy when the motor is used as a generator under the output from the engine, and regenerated energy obtained from regeneration of the motor at the time of vehicle deceleration, comprising: a remaining charge computing device (battery ECU 13) for computing the remaining charge of the storage unit, a speed detector (vehicle speed sensor S1) for detecting the speed of the vehicle, a regeneration amount setting device (step S202 and step S203) for setting the amount to be regenerated from the motor, and a regeneration amount reduction device (step S207) for, at the time of reducing the speed of the vehicle when a degree of throttle opening of the vehicle is fully closed state, or fuel supply to the engine is stopped, in the case where the remaining charge is computed by the remaining charge computing device to be greater than or equal to a predetermined remaining charge, and the speed is detected by the speed detector to be greater than or equal to a predetermined speed, multiplying the amount to be regenerated by a predetermined reduction coefficient.

According to the control apparatus for a hybrid vehicle of the above construction, in the case where the remaining battery charge of the storage unit is greater than or equal to a predetermined value, and the speed of the vehicle is greater than or equal to a predetermined speed, the regeneration amount by regeneration of the motor is reduced to prevent excessive deceleration of the hybrid vehicle, and the deceleration perceived by the driver is made appropriate. Consequently, unnecessary pressing of the accelerator pedal by the driver can be controlled. As a result, a decrease in frequency of regeneration of the motor can be prevented, and deterioration of fuel consumption ratio can be prevented by a decrease in the frequency of stopping the fuel supply.

Furthermore, the control apparatus for the hybrid vehicle of the present invention of a second aspect further comprising: a brake operation detector (brake switch S4) for detecting the brake operation of the vehicle, and a regeneration amount reduction inhibiting device (step S201) for, in the case where the brake operation detector detects that the brake is working, inhibiting the operation of the regeneration amount reduction device.

According to the control apparatus for a hybrid vehicle of the above construction, in the case where the brake pedal is pressed, it is determined that deceleration of the hybrid vehicle is requested by the driver, and reduction of the regeneration amount from the regeneration of the motor is inhibited. Consequently, the driver's intention is accurately reflected, and the hybrid vehicle can be decelerated, and regenerated energy can be obtained without unnecessary reduction of the regeneration amount.

Moreover, according to the control apparatus for a hybrid vehicle of the present invention of a third aspect, the hybrid vehicle is provided with an automatic transmission (transmission T) and gear shift schedule controller (CVTECU 14) for changing a gear shift schedule according to traveling conditions of the vehicle, and the regeneration amount reduction inhibiting device, in the case where the gear shift schedule controller is operating, or a deceleration ratio of the automatic transmission is larger than a predetermined deceleration ratio, inhibits the operation of the regeneration amount reduction device.

According to the control apparatus for a hybrid vehicle of the above construction, in the case where gear shift control is performed by the automatic transmission or the gear shift schedule controller, by inhibiting reduction of the regeneration amount, for example, it is possible to avoid disturbing the control for setting a large deceleration ratio to decelerate the hybrid vehicle at the time of traveling down a slope, and for changing the gear shift schedule to improve the effect of the engine brake.

DESCRIPTION OF THE PREFERRED EMBODIMENT

Figure 1:
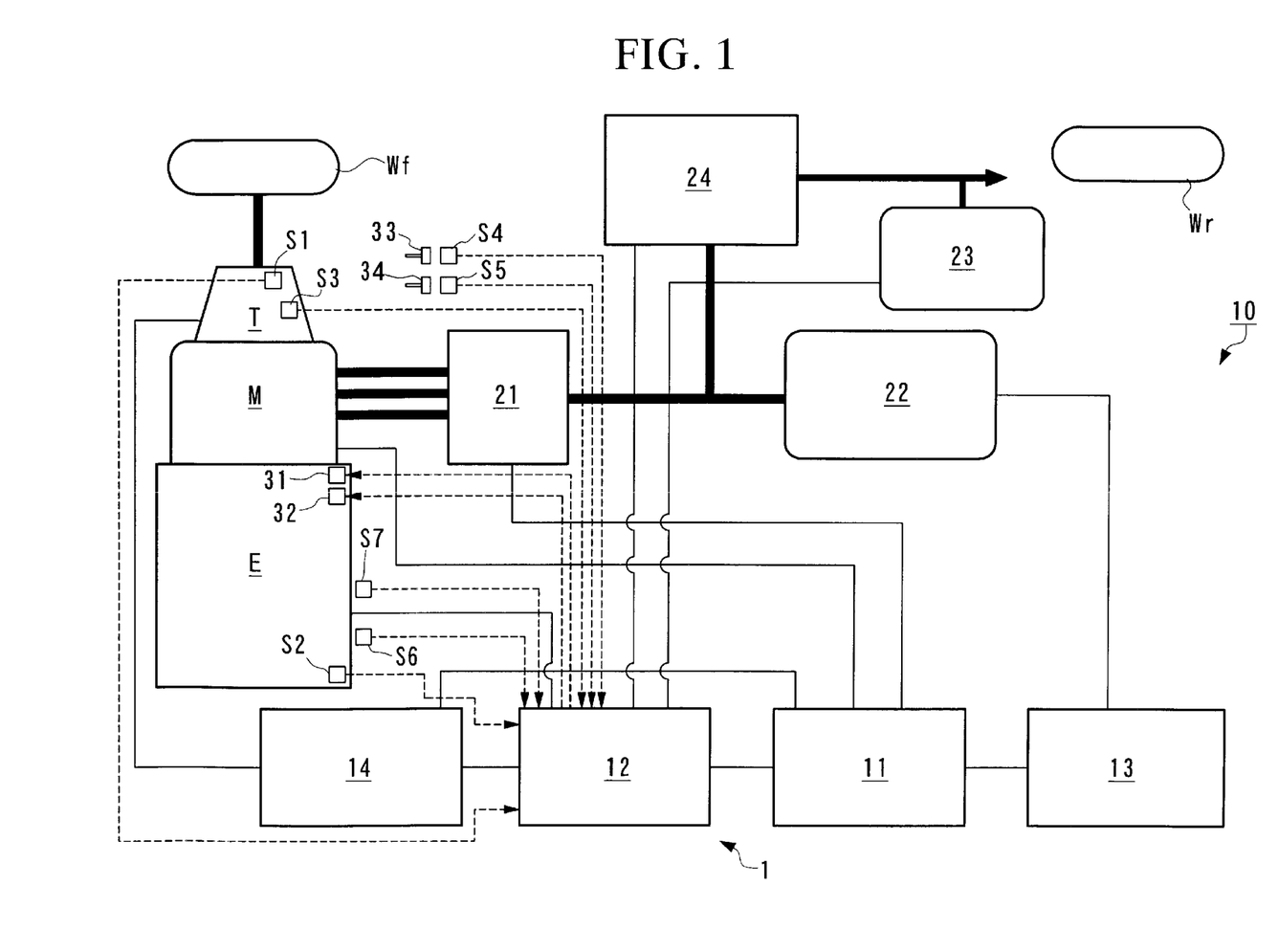
FIG. 1 is a schematic diagram of a hybrid vehicle incorporating a hybrid vehicle control apparatus according to one embodiment of the present invention.

Hereinafter is a description of an embodiment of a control apparatus for a hybrid vehicle of the present invention, with reference to the appended drawings. FIG. 1 is a schematic diagram of a hybrid vehicle 10 incorporating a hybrid vehicle control apparatus 1 according to the embodiment of the present invention.

The hybrid vehicle 10 corresponds for example to a parallel hybrid vehicle. The driving force from both an engine E and a motor M is transmitted to the front wheels Wf, Wf (only one side shown in FIG. 1) serving as driving wheels via a transmission T comprising either an automatic transmission or a manual transmission. Furthermore, when the driving force is transmitted to the motor M from the front wheels Wf, Wf at the time of deceleration of the hybrid vehicle 10, the motor M functions as a generator to produce so called regenerative braking force, and the kinetic energy of the vehicle is recovered as electrical energy.

The control apparatus 1 for the hybrid vehicle according to this embodiment comprises a motor ECU 11, an FIECU 12, a battery ECU 13 and a CVTECU 14.

The drive and regeneration of the motor M is performed by a power drive unit 21, which receives control instructions from the motor ECU 11. A battery 22 of a high voltage system for transferring electrical energy and the motor M is connected to the power drive unit 21. The battery 22 is constructed from individual modules where a plurality of cells, for example 20 cells, is connected in series, with a plurality of these modules, for example 10 modules, connected in series. Mounted on the hybrid vehicle 10 is a 12-volt auxiliary battery 23 for driving various accessories. This auxiliary battery 23 is connected to the battery 22 via a downverter 24. The down converter 24, which is controlled by the FIECU 12, reduces the voltage of the battery 22 for charging the auxiliary battery 23.

The FIECU 12, in addition to the motor ECU 11 and the downverter 24, controls the operation of a fuel supply amount control device 31 for controlling the fuel supply amount to the engine E, the operation of a starter motor 32, and also the ignition timing. Therefore, inputs to the FIECU 12 are: a signal from a vehicle speed sensor S1 for detecting the vehicle speed V based on the revolution speed of a drive shaft in the transmission T, a signal from an engine speed sensor S2 for detecting engine speed NE, a signal from a shift position sensor S3 for detecting the shift position of the transmission T, a signal from a brake switch S4 for detecting operation of a brake pedal 33, a signal from a clutch switch S5 for detecting the operation of a clutch pedal 34, a signal from a throttle opening sensor S6 for detecting degree of throttle opening TH, and a signal from an air intake passage pressure sensor S7 for detecting air intake passage pressure PB.

Furthermore, the battery ECU 13 protects the battery 22, and computes the remaining battery charge (State of Charge) SOC of the battery 22. The CVTECU 14 controls the CVT.

Figure 2:
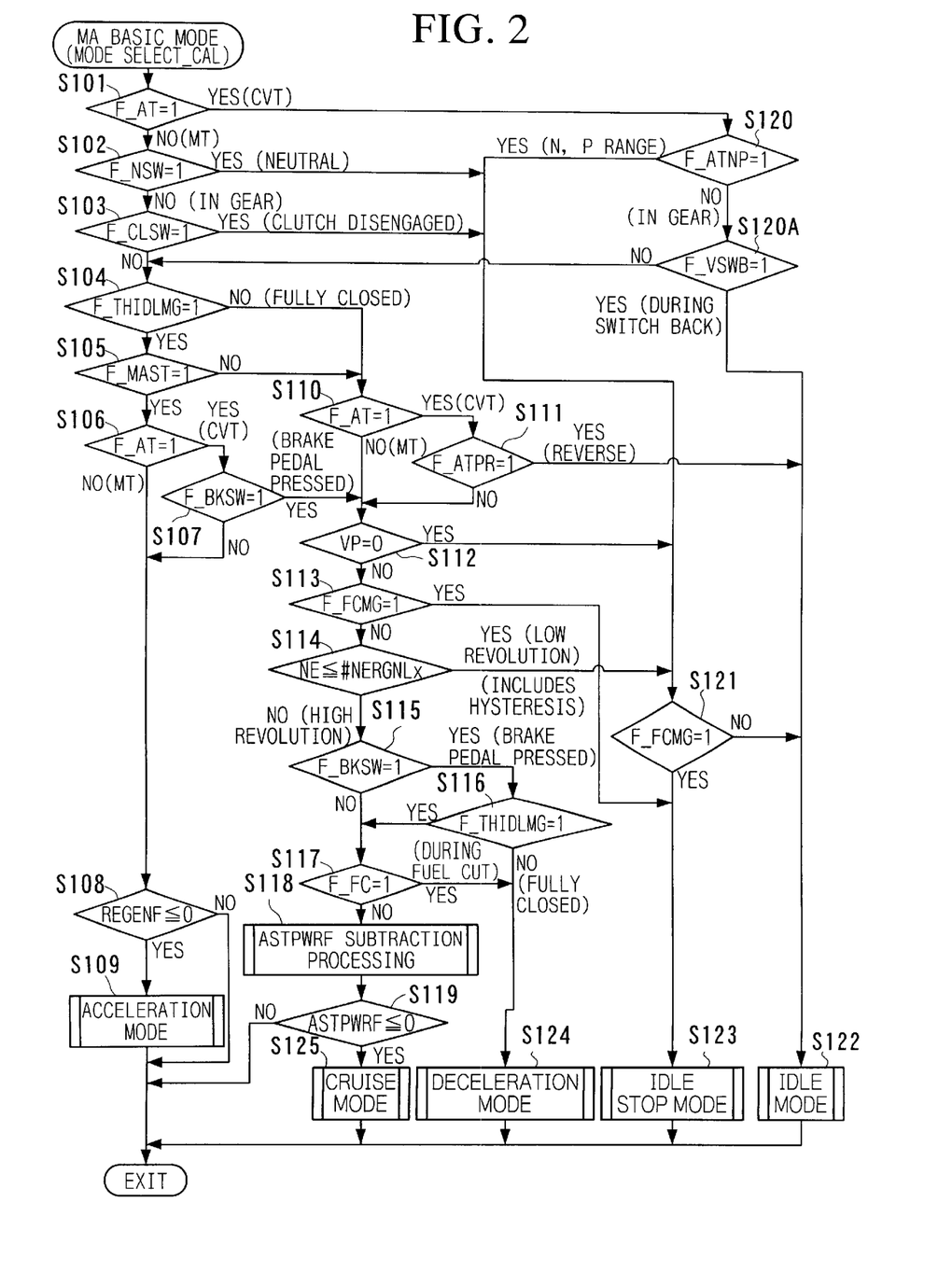
FIG. 2 is a flow chart showing motor operating mode determination.
Figure 3:
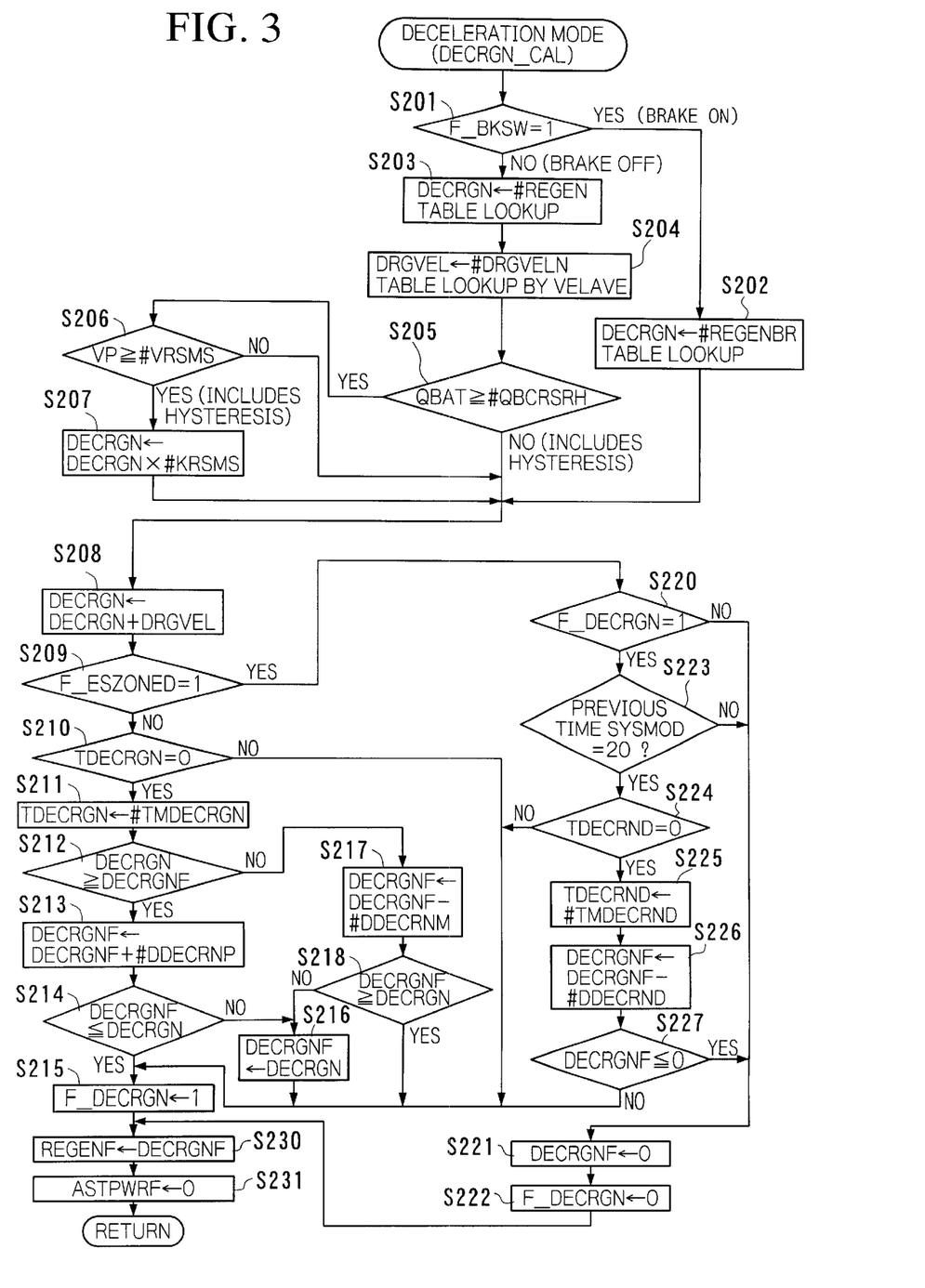
FIG. 3 is a flow chart showing operation of deceleration mode.
Figure 4:
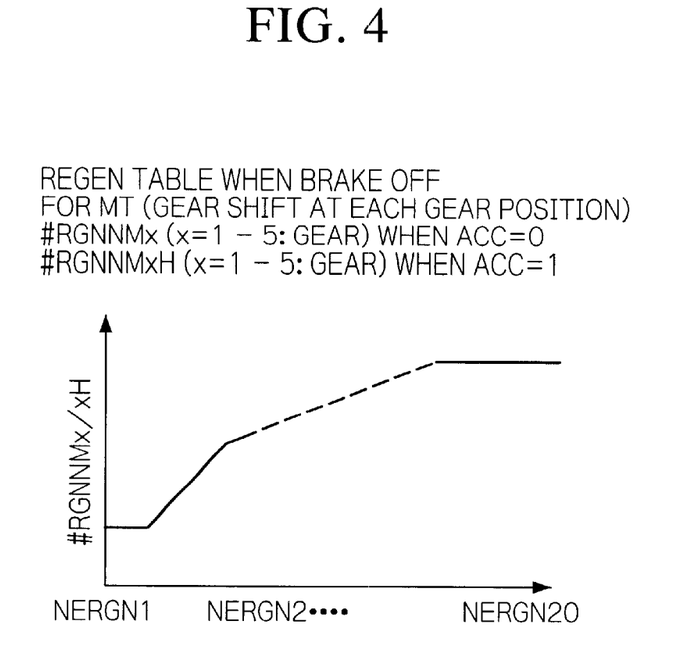
FIG. 4 is a graph showing a regeneration amount table of an MT (Manual Transmission) vehicle when the brake is OFF with respect to the engine speed NERGN1 through to NERGN20
Figure 5:
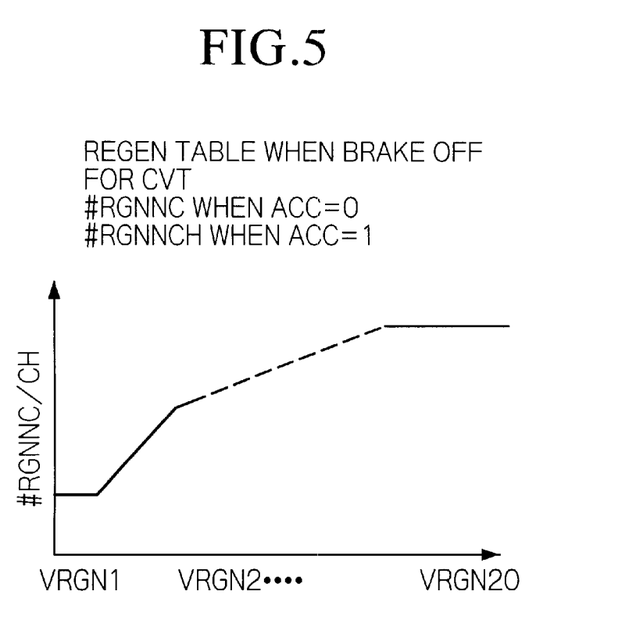
FIG. 5 is a graph showing a regeneration amount table of a CVT (Continuously Variable Transmission) vehicle when the brake is OFF with respect to the control vehicle speed VRGN1 through to VRGN20.
Figure 6:
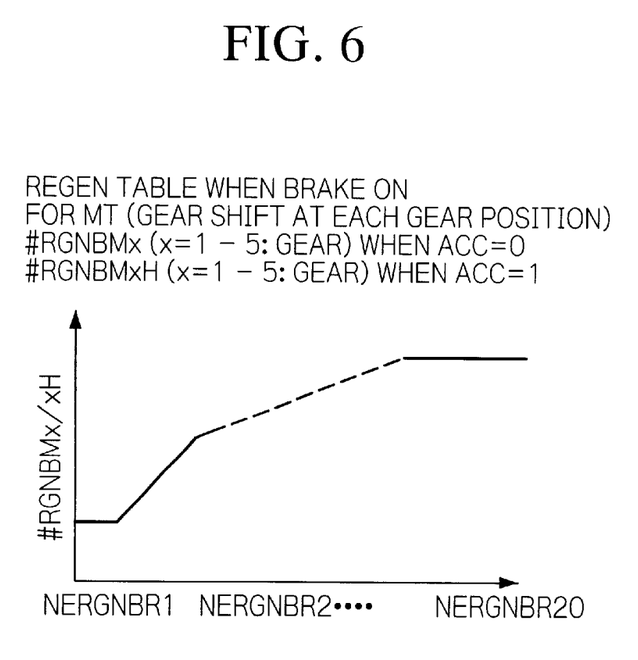
FIG. 6 is a graph showing a regeneration amount table of the MT vehicle when the brake is ON with respect to the engine speed NERGNBR1 through to NERGNBR20.
Figure 7:
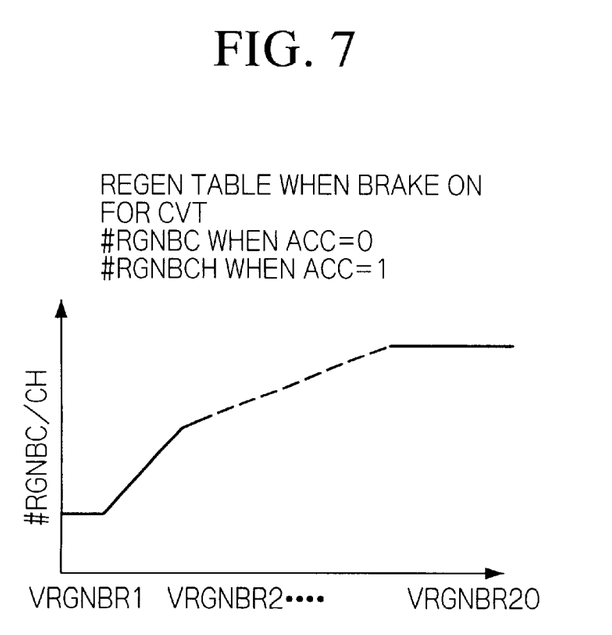
FIG. 7 is a graph showing a regeneration amount table of the CVT vehicle when the brake is ON with respect to the control vehicle speed VRGNBR1 through to VRGNBR20.
Figure 8:
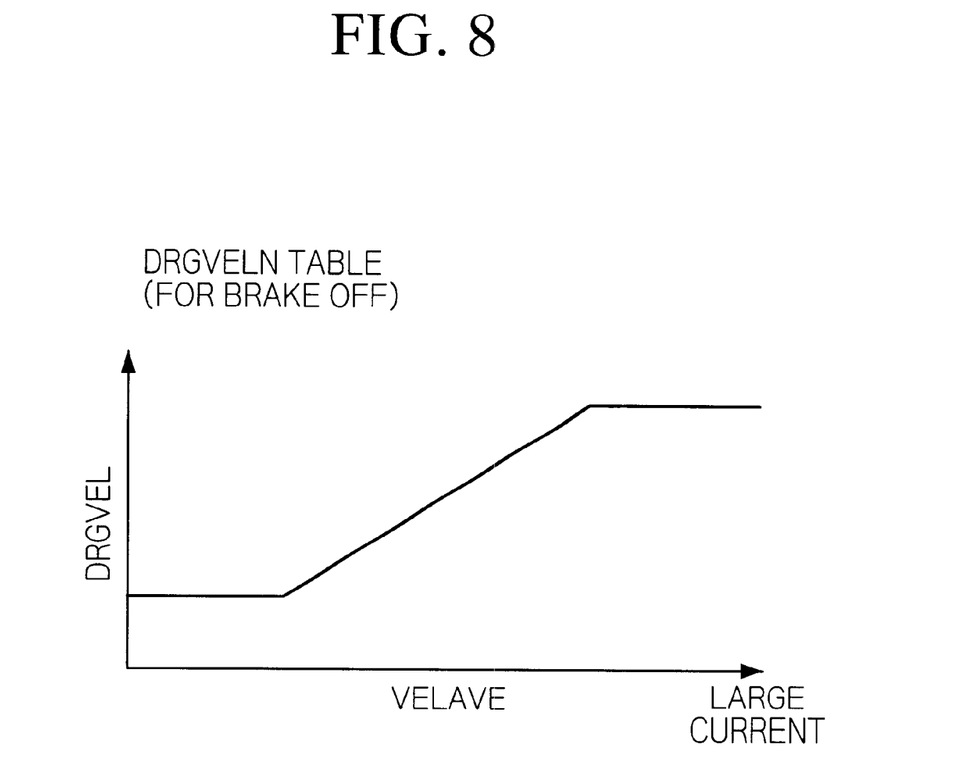
FIG. 8 is a graph showing a regeneration EL correction amount table when the brake is OFF.

The hybrid vehicle control apparatus 1 of the embodiment is incorporated in the above construction. Next is a description of the operation of the hybrid vehicle control apparatus 1, with reference to the appended drawings. FIG. 2 is a flow chart showing motor operating mode determination, FIG. 3 is a flow chart showing operation of the deceleration mode, FIG. 4 is a graph showing a regeneration amount table for an MT vehicle at the time the brake is OFF with respect to the engine speed NERGN 1 through to NERGN 20, FIG. 5 is a graph showing a regeneration amount table for a CVT vehicle when the brake is OFF with respect to the control vehicle speed, VRGN 1 through to VRGN 20, FIG. 6 is a graph showing a regeneration amount table for an MT vehicle when the brake is ON with respect to the engine speed NERGNBR 1 through to NERGNBR 20, FIG. 7 is a graph showing the regeneration amount table for a CVT vehicle when the brake is ON with respect to the control vehicle speed, VRGNBR 1 through to VRGNBR 20, and FIG. 8 is a graph showing the regeneration EL correction amount table when the brake is OFF.

This hybrid vehicle 10 has control modes: "idle stop mode", "idle mode", "deceleration mode", "acceleration mode" and "cruise mode".

There follows a description of the processing of motor operating mode determinations based on the flow chart of FIG. 2.

First, in step S101, it is determined whether the flag setting of an MT/CVT determination flag F_AT is "1". In the case where the determination result is "NO", that is, it is determined to be an MT vehicle, control proceeds to step S102 as mentioned later.

On the other hand, in the case where the determination result is "YES", that is it is determined to be a CVT vehicle, control proceeds to step S120. Here, it is determined whether the flag setting of CVT in gear determination flag F_ATNP is "1". In the case where the determination result in step S120 is "NO", that is, it is determined to be in gear, control proceeds to step S120A, and it is determined whether the flag setting of the switchback determination flag F_VSWB is "1". In the case where the determination result is "NO", that is it is determined that the shift lever is not being operated, the processing of step S104 and thereafter as mentioned later is performed. On the other hand, in the case where the determination result in step S120A is "YES", that is, it is determined that the shift lever is being operated, control proceeds to step S122, shifts to "idle mode", and the series of processing is terminated. With the idle mode, fuel supply is resumed after fuel supply cut to maintain the engine E in an idle condition.

On the other hand, in the case where the determination result of step S120 is "YES", that is it is determined to be N, P range, control proceeds to step S121, and it is determined whether the flag setting of the engine stop control execution flag F_FCMG is "1". In the case where the determination result is "NO", control proceeds to "idle mode" in step S122, and the series of processing is terminated.

On the other hand, in step S121, in the case where the flag setting of the engine stop control execution flag F_FCMG is determined to be "1", control proceeds to step S123, shifts to "idle stop mode", and the series of processing is terminated. With the idle stop mode, for example at the time the vehicle is stopped, the engine E is stopped in a predetermined condition.

In step S102, it is determined whether the flag setting of the neutral position determination flag F_NSW is "1". In the case where the determination result is "YES", that is, it is determined to be in neutral position, the processing of step S121 and thereafter is performed.

On the other hand, in the case where the determination result in step S102 is "NO", that is, it is determined to be in gear, control proceeds to step S103, and here it is determined whether the flag setting of the clutch engagement determination flag F_CLSW is "1". In the case where the determination result is "YES", that is, it is determined that the clutch is "disengaged", control proceeds to step S121.

On the other hand, in the case where the determination result in step S103 is "NO", that is, it is determined that the clutch is "engaged", control proceeds to step S104.

In step S104, it is determined whether the flag setting of the IDLE determination flag F_THIDLMG is "1". In the case where the determination result is "NO", that is, it is determined that the throttle is fully closed, control proceeds to step S110 as mentioned later.

On the other hand, in the case where the determination result in step S104 is "YES", that is, it is determined that the throttle is not fully closed, control proceeds to step S105, and it is determined whether the flag setting of the motor assistance determination flag F_MAST is "1".

Then, in the case where the determination result of step S105 is "NO", control proceeds to step S110 as mentioned later. On the other hand, in the case where the determination result of step S105 is "YES", control proceeds to step S106.

In step S106, it is determined whether the flag setting of the MT/CVT determination flag F_AT is "1". In the case where the determination result is "NO", that is, it is determined to be an MT vehicle, control proceeds to step S108, and it is determined whether the final charge instruction value REGENF is less than or equal to zero. In the case where the determination result is "NO", the series of processing is terminated. On the other hand, in the case where the determination result in step S108 is "YES", control proceeds to "acceleration mode" in step S109, and the series of processing is terminated.

On the other hand, in the case where the determination result in step S106 is "YES", that is, it is determined to be a CVT vehicle, control proceeds to step S107, and it is determined whether the flag setting of the brake ON determination flag F_BKSW is "1". In the case where the determination result is "YES", that is, it is determined that the brake pedal is pressed, control proceeds to step S112 as mentioned later.

On the other hand, in the case where the determination result of step S107 is "NO", that is, it is determined that the brake pedal is not pressed, control proceeds to step S108.

In step S110, it is determined whether the flag setting of the MT/CVT determination flag F_AT is "1". In the case where the determination result is "NO", that is, it is determined to be an MT vehicle, control proceeds to step S112 as mentioned later.

On the other hand, in the case where the determination result is "YES", that is, it is determined to be a CVT vehicle, control proceeds to step S111, and it is determined whether the flag setting of the CVT reverse position determination flag F_ATPR is "1". In the case where the determination result is "YES", that is, it is determined that the CVT is in reverse position, control proceeds to step S122, shifts to "idle mode", and the series of processing is terminated.

On the other hand, in the case where the determination result of step S111 is "NO", that is, it is determined that the CVT is not in reverse position, control proceeds to step S112.

In step S112, it is determined whether the engine control vehicle speed VP is "0". In the case where the determination result is "YES", that is, it is determined that the engine control vehicle speed VP is zero, control proceeds to step S121.

On the other hand, in the case where the determination result is "NO", that is, it is determined that the engine control vehicle speed VP is not zero, control proceeds to step S113.

In step S113, it is determined whether the flag setting of the engine stop control execution flag F_FCMG is "1". In the case where the determination result is "YES", control proceeds to step S123 and shifts to "idle stop mode", and the series of processing is terminated.

On the other hand, in the case where the determination result of step S113 is "NO", control proceeds to step S114.

In step S114, the engine speed NE and the cruise/deceleration mode lower limit engine speed #NERGNLx are compared. Here, "x" in the cruise/deceleration mode lower limit engine speed #NERGNLx is a value (including hysteresis) set for each gear.

As a result of the determination in step S114, in the case where it is determined that the engine speed NE≦ the cruise/deceleration mode lower limit engine speed #NERGNLx, that is, it is determined to be revolving slowly, control proceeds to step S121. On the other hand, in the case where it is determined the engine speed NE>the cruise/deceleration mode lower limit engine speed #NERGNLx, that is, it is determined to be revolving quickly, control proceeds to step S115.

In step S115, it is determined whether the flag setting of the brake ON determination flag F_BKSW is "1". In the case where the determination result is "NO", that is, it is determined that the brake pedal is not pressed, control proceeds to step S117. On the other hand, in the case where the determination result is "YES", that is it is determined that the brake pedal is pressed, control proceeds to step S116.

In step S116, it is determined whether the flag setting of the IDLE determination flag F_THIDLMG is "1". In the case where the determination result is "NO", that is, it is determined that the throttle is fully closed, control proceeds to step S124, shifts to "deceleration mode", and the series of processing is terminated.

On the other hand, in the case where the determination result of step S116 is "YES", that is, the throttle is not fully closed, control proceeds to step S117.

In step S117, it is determined whether the flag setting of the fuel supply cut execution flag F_PC is "1". In the case where the determination result is "YES", that is it is determined that the fuel supply is stopped, control proceeds to step S124, shifts to "deceleration mode", and the series of processing is terminated. On the other hand, in the case where the determination result is "NO", control proceeds to S118.

In step S118, the subtraction processing for the final assistance instruction value ASTPWRF is performed, then, control proceeds to step S119.

In step S119, it is determined whether the final assistance instruction value ASTPWRF is less than or equal to zero. In the case where the determination result is "YES", control proceeds to step S125, and shifts to "cruise mode". On the other hand, in the case where the determination result is "NO", the series of the processing is terminated.

Next is a description of the processing of the deceleration mode, with reference to FIG. 3 through FIG. 9.

First, it is determined whether the flag setting of the brake ON determination flag F_BKSW is "1" (step S201). In the case where the determination result is "YES", that is, it is determined that the brake pedal is pressed, the value of brake ON regeneration amount #REGENBR is obtained for an MT vehicle, by reference to the table of regeneration amount #RGNBMx/xH for the engine control vehicle speed NERGNBR 1, . . . , NERGNBR 20 as shown in FIG. 6, or for a CVT vehicle, by reference to the table of regeneration amount #RGNBC/CH for the engine control vehicle speed VRGNBR 1, . . . , VRGNBR 20 as shown in FIG. 7, and this is assigned to the deceleration regeneration computed value DECRGN (step S202). Then the processing of step S208 and thereafter is performed. That is to say, in the case where the brake pedal is pressed and it is obvious that the vehicle requires deceleration, the process of reducing regeneration amount at the time of deceleration is not performed.

On the other hand, in the case where the determination result of step S201 is "NO", that is, it is determined that the brake pedal is not pressed, the value of brake OFF regeneration amount #REGEN is obtained for an MT vehicle, by reference to the table of regeneration amount #RGNNMx/xH for the engine speed NERGN 1, . . . , NERGN 20 as shown in FIG. 4, or for a CVT vehicle, by reference to the table of the regeneration amount #RGNNC/CH for the control vehicle speed VRGN 1, . . . , VRGN 20 as shown in FIG. 5, and this is assigned to the deceleration regenerative computed value DECRGN (step S203).

Then, the deceleration regenerative EL correction amount DRGVEL is obtained by reference to the deceleration regeneration EL correction amount table value DRGVELN (n=3) as shown in FIG. 8, corresponding to the average current VELAVE (step S204).

Next, in step S205 it is determined whether the remaining battery charge QBAT (equivalent to the remaining battery charge (state of charge) SOC set to the upper limit of zone A) is greater than or equal to a predetermined normal power generation mode execution upper limit remaining charge #QBCRSRH. The normal power generation mode execution upper limit remaining charge #QBCRSRH is a value with hysteresis.

Here, in the embodiment of the present invention, in the battery ECU13, zone dividing (so called zoning) of the remaining battery charge SOC computed for example based on voltage, discharging current, temperature etc. is performed, and a plurality, for example four zones, A, B, C, D, are set. For example, with zone A (from SOC 40% to SOC 80% through 90%) being a normal use zone, as a base, zone B (from SOC 20% to SOC 40%) being a temporary use zone is positioned below this, and zone C (from SOC 0% to SOC 20%) being an over-discharge zone, further below this. Furthermore, on zone A is set zone D (from SOC 80% through 90% to SOC 100%) being an overcharge zone.

In the case where the determination result of step S205 is "NO", that is, it is determined that the remaining battery charge QBAT<the normal power generation mode execution upper limit remaining charge #QBCRSRH, control proceeds to step S208 as mentioned later.

On the other hand, in the case where the determination result of step S205 is "YES", that is, it is determined that the remaining battery charge QBAT≧the normal power generation mode execution upper limit remaining charge #QBCRSRH, control proceeds to step S206.

In step S206, it is determined whether the control vehicle speed VP is equal to or above a predetermined high speed deceleration regeneration reduction lower limit vehicle speed #VRSMS, for example greater than or equal to 90 through 95 km/h. Here, the high speed deceleration regeneration reduction lower limit vehicle speed #VRSMS is a value with hysteresis.

In the case where the determination result of step S206 is "NO", control proceeds to the processing of step S208 and thereafter as mentioned later. On the other hand, in the case where the determination result is "YES", the value obtained by multiplying the deceleration regeneration computed value DECRGN by a predetermined high speed deceleration regeneration reduction coefficient #KRSMS, for example 0.8, is set as a new deceleration regeneration computed value DECRGN (step S207). That is to say, in the case where the remaining battery charge QBAT is equal to or above a predetermined amount, and the control vehicle speed VP is equal to or above the predetermined speed, the regeneration amount at the time of deceleration is reduced.

Then, in step S208, the value obtained by adding the deceleration regeneration EL correction amount DRGVEL set in step S204 to the deceleration regeneration computed value DECRGN, is set as a new deceleration regeneration computed value DECRGN.

Next, it is determined whether the energy storage zone D determination flag F_ESZONED is "1" (step S209). In the case where the determination result is "YES", control proceeds to step S220 as mentioned later. On the other hand, in the case where the determination result is "NO", control proceeds to step S210.

In step S210, it is determined whether the Gradual addition/subtraction update timer TDECRGN is zero. In the case where the determination result is "NO", control proceeds to step S215 as mentioned later. On the other hand, in the case where the determination result is "YES", control proceeds to step S211.

In step S211, a predetermined timer value #TMDECRGN is assigned to the gradual addition/subtraction update timer TDECRGN, and control proceeds to step S212.

Then, in step S212 it is determined whether the deceleration regeneration computed value DECRGN is greater than or equal to the deceleration regeneration final computed value DECRGNF.

In the case where the determination result of step S212 is "YES", that is, it is determined that the deceleration regeneration computed value DECRGN≧the deceleration regeneration final computed value DECRGNF, the value obtained by adding the gradual addition term #DDECRNP to the deceleration regeneration final computed value DECRGNF is set as a new deceleration regeneration final computed value DECRGNF (step S213). Subsequently, it is determined whether the deceleration regeneration final computed value DECRGNF is less than or equal to the deceleration regeneration computed value DECRGN (step S214).

In the case where the determination result of step S214 is "YES", that is, it is determined that the deceleration regeneration final computed value DECRGNF≦the deceleration regeneration computed value DECRGN, "1" is set for the deceleration regeneration permission flag F_DECRGN (step S215), and control proceeds to step S230 as mentioned later.

On the other hand, in the case where the determination result of step S214 is "NO", that is, it is determined that the deceleration regeneration final computed value DECRGNF>the deceleration regeneration computed value DECRGN, the deceleration regeneration computed value DECRGN is assigned to the deceleration regeneration final computed value DECRGNF (step S216). Subsequently, control proceeds to step S215.

Furthermore, in the case where the determination result of step S212 is "NO", that is, the deceleration regeneration computed value DECRGN<the deceleration regeneration final computed value DECRGNF, the value obtained by subtracting the gradual subtraction term #DDECRNM from the deceleration regeneration final computed value DECRGNF, is set as a new deceleration regeneration final computed value DECRGNF (step S217). Then, it is determined whether the deceleration regeneration final computed value DECRGNF is greater than or equal to the deceleration regeneration computed value DECRGN (step S218).

In the case where the determination result of step S218 is "YES", that is, it is determined that the deceleration regeneration final computed value DECRGNF≧the deceleration regeneration computed value DECRGN, control proceeds to step S215. On the other hand, in the case where the determination result of step S218 is "NO", that is, it is determined that the deceleration regeneration final computed value DECRGNF<the deceleration regeneration computed value DECRGN, control proceeds to step S216.

Furthermore, in step S220 it is determined whether the flag setting of the deceleration regeneration permission flag F_DECRGN is "1". In the case where the determination result is "NO", a "0" is set for the deceleration regeneration final computed value DECRGNF (step S221). Then a "0" is set for the deceleration regeneration permission flag F_DECRGN (step S222), and control proceeds to step S230 as mentioned later.

On the other hand, in the case where the determination result of step S220 is "YES", it is determined whether the previous time was deceleration mode (SYSMOD=20). In the case where the determination result is "NO", that is, it is determined that the previous time was not deceleration mode, control proceeds to step S221.

On the other hand, in the case where the determination result of step S223 is "YES", that is, it is determined that the previous time was deceleration mode, control proceeds to step S224, and it is determined whether the DDECRND gradual subtraction update timer TDECRND is zero. In the case where the determination result is "NO", control proceeds to step S215. On the other hand, in the case where the determination result is "YES", that is, it is determined that the DDECRND gradual subtraction update timer TDECRND is zero, control proceeds to step S225.

In step S225, a predetermined gradual subtraction update timer value #TMDECRND is assigned to the DDECRND gradual subtraction update timer TDECRND. In step S226, the value obtained by subtracting a predetermined gradual subtraction term #DDECRND from the deceleration regeneration final computed value DECRGNF, is set as a new deceleration regeneration final computed value DECRGNF. Then, in step S227 it is determined whether the deceleration regeneration final computed value DECRGNF is less than or equal to zero.

In the case where the determination result is "NO", control proceeds to step S215. On the other hand, in the case where the determination result is "YES", control proceeds to step S221.

Furthermore, in step S230 the deceleration regeneration final computed value DECRGNF is assigned to the final charge instruction value REGENF, and control proceeds to step S231. Then a "0" is set for the final assistance instruction value ASTPWRF, and the series of processing is terminated.

With the hybrid vehicle control apparatus 1 according to this embodiment, in the case where it is determined that the remaining battery charge QBAT≧the normal power generation mode execution upper limit remaining charge #QBCRSRH, and the control vehicle speed VP≧the high speed deceleration regeneration reduction lower limit vehicle speed #VRSMS, the value obtained by multiplying the deceleration regeneration computed value DECRGN from the regeneration of the motor M by a predetermined high speed deceleration regeneration reduction coefficient #KRSMS, for example 0.8, is set as a new deceleration regeneration computed value DECRGN. Consequently, the regeneration amount at the time of deceleration is reduced to prevent excessive deceleration of the hybrid vehicle 10, and the deceleration perceived by the driver can be made appropriate. As a result, the traveling perception at the time of high speed traveling can be improved, which enables suppression of the driver's unnecessary pressing of the accelerator pedal. Furthermore, it is possible to maintain appropriate regeneration of the motor M and also to prevent deterioration of fuel consumption rate by reducing the frequency of stopping the fuel supply to the engine E.

Moreover, in the case where the brake pedal 33 is pressed, it is determined that deceleration of the vehicle is requested by the driver, and multiplying the deceleration regeneration computed value DECRGN from the regeneration of the motor M by the predetermined high speed deceleration regeneration reduction coefficient #KRSMS is inhibited. Consequently, the driver's intention is accurately reflected, and the hybrid vehicle 10 can be decelerated, and regenerated energy can be obtained without unnecessary reduction of the deceleration regeneration computed value DECRGN.

Figure 9:
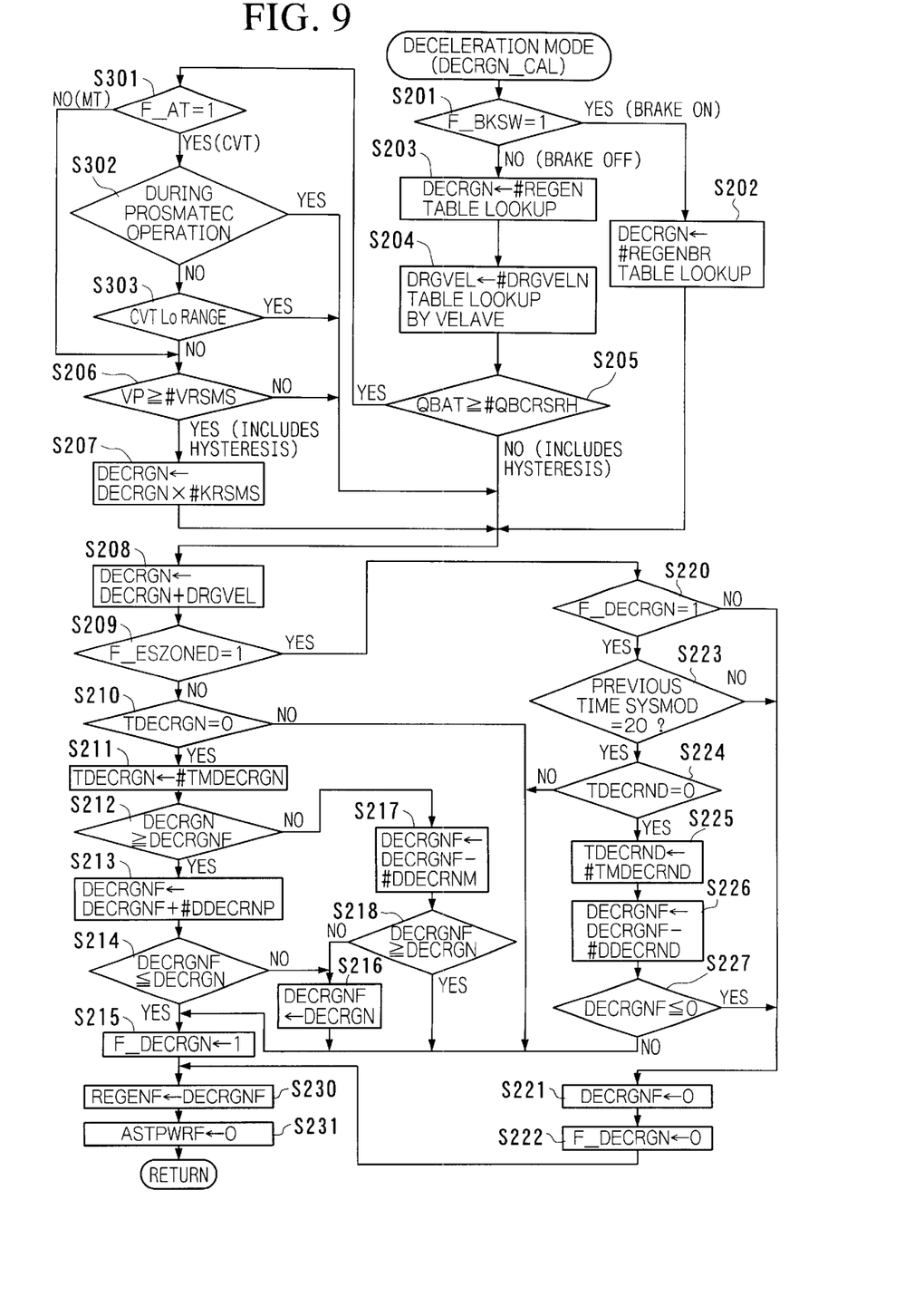
FIG. 9 shows a modified example of the flow chart showing operation of the deceleration mode of FIG. 3, in the operation of the control apparatus of the hybrid vehicle according to the embodiments.

Next is a description of the operation of the hybrid vehicle control apparatus according to the above-mentioned embodiment, specifically of a modified example of the flow chart showing the operation of the deceleration mode of FIG. 3. FIG. 9 shows the modified example of the flow chart showing the operation of the deceleration mode shown in FIG. 3. In this modified example, since a point of difference from the above-mentioned embodiment is the processing of step S205 to step S206 of FIG. 3, the same symbols are assigned to the same parts, and the description is omitted. Hereinafter is a description of the processing between step S205 and step S206.

As is shown in FIG. 9, first in step S205 it is determined whether the remaining battery charge QBAT (equivalent to the remaining battery charge SOC set to the upper limit of zone A) is greater than or equal to a predetermined normal power generation mode execution upper limit remaining charge #QBCRSRH. In the case where the determination result is "NO", that is, it is determined that the remaining battery charge QBAT<the normal power generation mode execution upper limit remaining charge #QBCRSRH, control proceeds to step S208.

On the other hand, in the case where the determination result of step S205 is "YES", that is, it is determined that the remaining battery charge QBAT≧the normal power generation mode execution upper limit remaining charge #QBCRSRH, control proceeds to step S301.

In step S301, it is determined whether the flag setting of the MT/CVT determination flag F_AT is "1". In the case where the determination result is "NO", that is, it is determined to be an MT vehicle, control proceeds to step S206. On the other hand, in the case where the determination result is "YES", that is, it is determined to be a CVT vehicle, control proceeds to step S302.

In step S302, it is determined whether "prosmatec" (progressive shift schedule management technology) control is being performed. In the case where the determination result is "YES", that is, it is determined that prosmatec control is being performed, control proceeds to step S208. On the other hand, in the case where the determination result is "NO", that is, it is determined that prosmatec control is not being performed, control proceeds to step S303.

Here, prosmatec control is a control for correcting a shift control map to be used for a CVT vehicle gear shift control according to the traveling condition, to change the gear shift schedule. For example, at the time of ascending and descending a slope, it is arranged that smooth traveling can be performed by appropriately changing the gear shift point for shifting up and shifting down depending on the uphill grade and downhill grade.

In step S303, it is determined whether the CVT is in a low range. In the case where the determination result is "YES", control proceeds to step S208. On the other hand, in the case where the determination result is "NO", control proceeds to step S206. Here, for example at the time of traveling down the slope, the CVT is set in a low range, where the ratio of deceleration is large, and in the case where deceleration of the vehicle is requested, the processing for reducing the regenerated amount at the time of deceleration is not performed.

What is claimed is:

1. A control apparatus for a hybrid vehicle comprising: an engine for outputting a propulsion force for a vehicle, a motor for assisting the output from said engine depending on the driving conditions of said vehicle, and a storage unit for storing generated energy when said motor is used as a generator under the output from said engine, and regenerated energy obtained from regeneration of said motor at the time of vehicle deceleration, comprising:

a remaining charge computing device for computing the remaining charge of said storage unit, a speed detector for detecting the speed of said vehicle, a regeneration amount setting device for setting the amount to be regenerated from said motor, and a regeneration amount reduction device for, at the time of reducing the speed of said vehicle when a degree of throttle opening of said vehicle is fully closed state, or fuel supply to said engine is stopped, in the case where said remaining charge is computed by said remaining charge computing device to be greater than or equal to a predetermined remaining charge, and said speed is detected by said speed detector to be greater than or equal to a predetermined speed, multiplying said amount to be regenerated by a predetermined reduction coefficient.

2. A control apparatus for a hybrid vehicle according to claim 1, further comprising:

a brake operation detector for detecting the brake operation of said vehicle, and a regeneration amount reduction inhibiting device for, in the case where said brake operation detector detects that said brake is working, inhibiting the operation of said regeneration amount reduction device.

3. A control apparatus for a hybrid vehicle according to claim 2, wherein said hybrid vehicle is provided with an automatic transmission and gear shift schedule controller for changing a gear shift schedule according to traveling conditions of said vehicle, and said regeneration amount reduction inhibiting device, in the case where said gear shift schedule controller is operating, or a deceleration ratio of said automatic transmission is larger than a predetermined deceleration ratio, inhibits the operation of said regeneration amount reduction device.

* * * * *